Aug. 6, 1968 V. H. CLAUSEN ET AL 3,395,915
VACUUM STACKER APPARATUS
Filed July 18, 1967
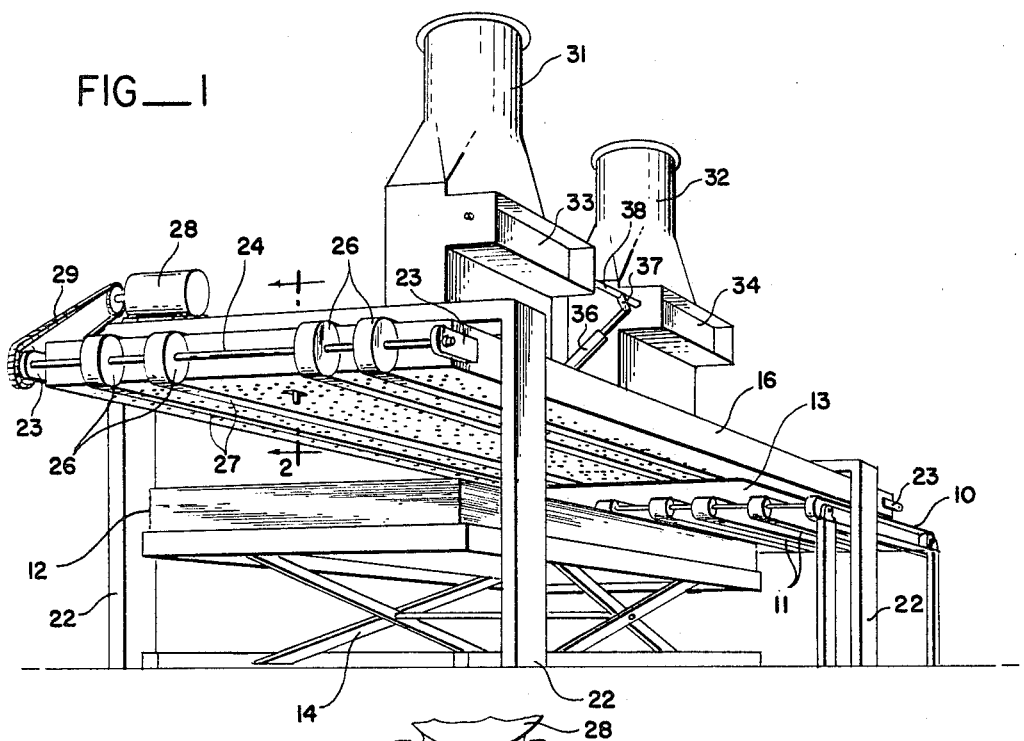
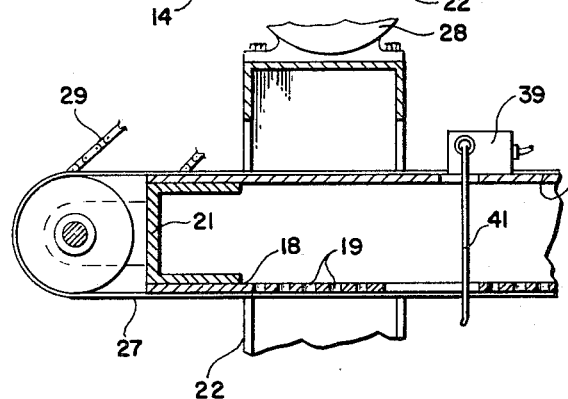
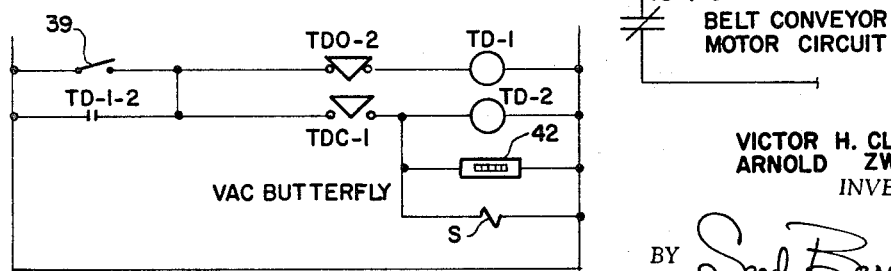
VICTOR H. CLAUSEN
ARNOLD ZWEIG
INVENTOR.
BY
ATTORNEYS 3,395,915
VACUUM STACKER APPARATUS
Victor H. Clausen, Bellevue, and Arnold Zweig, Olympia, Wash., assignors to Simpson Timber Company, Seattle, Wash., a corporation of Washington
Continuation-in-part of application Ser. No. 481,839, Aug. 23, 1965. This application July 18, 1967, Ser. No. 654,114
4 Claims. (Cl. 271—74)

ABSTRACT OF THE DISCLOSURE

A vacuum stacking apparatus for receiving sheets issuing from a conveyor and moving them to a drop position and then releasing the sheets which drop vertically by gravity. The device includes a vacuum chamber with contro's for applying and releasing vacuum pressure, the chamber having a perforated bottom wall for holding the sheets. A plurality of imperforate endless belts are arranged with their bottom runs moving across the perforated wall of the vacuum chamber. The sheets are carried along by the moving belts and held in contact with the belts and the perforated wall by vacuum pressure. When the sheets contact a limit switch on the preforated wall, the power means for the belts is cut off and the drag resulting from the vacuum pressure causes both the belts and the moving sheet to stop abruptly. As soon as the sheet is stopped the vacuum pressure is vented and the sheet is allowed to drop to a stack. In this manner the sheets are indexed or caused to stop in the exact position and are dropped to form a neat stack. As soon as the sheet is dropped, the belts are again energized and vacuum pressure is again applied to the vacuum chamber to receive, convey and drop the next succeeding sheet.

Background of the invention

This is a continuation-in-part of our co-pending patent application Ser. No. 481,839, filed Aug. 23, 1965.

The present invention relates to an apparatus for receiving and delivering individual sheets of material to form a stack. A vacuum chamber is utilized for holding a travelling sheet against a plurality of moving conveyor belts with the sheet being located beneath the chamber and forced vertically against the belts which travel across a bottom perforated face of the chamber. The stacker apparatus may be utilized in various ways as, for instance, being an actual section of a conveyor system or, as illustrated in the present embodiment, being so situated as to receive sheets which issue from a conventional belt or other conveyor system. In the prior art, stack forming devices of the character under consideration operated so as to release the sheet while still traveling and it was allowed to free fall to a stack without impeding its forward motion. With this operation, it is very difficult to form a neat stack. With certain kinds of sheet material it is impossible to form a neat even stack in this manner or to avoid damage to the sheet when it is released before its forward travel is halted.

The present invention seeks to alleviate the shortcomings of prior art devices of this character by controlling the operation of the conveyor belts and the application of vacuum pressure to the vacuum chamber in such a manner that the sheet is caused to come to a halt at a specific point before it is allowed to drop vertically. The impact of the moving sheets against stop means or stack forming guides is thus eliminated and accurate indexing for forming a neat stack is made possible. To accomplish this, the presence of the vacuum is used to provide an automatic braking drag on both the sheets and the conveyor belts in such a manner that the stopping position of the sheets may be accurately controlled. When the sheets and the conveyor belts are in the stop position, the control system acts to vent the vacuum chamber to atmosphere so as to release the sheet which falls vertically to form a stack. As soon as the sheet is dropped, the belts are again energized and the vacuum pressure applied to the chamber, ready for the reception, indexing and dropping of the next sheet.

Accordingly, the object of the present invention is to provide a vacuum stacking unit and conveyor combination which may be controlled so as to accurately index the dropping position of the sheets to thereby form neat stacks and to eliminate possible damage to sheets by halting their forward travel before dropping them vertically.

Still further objects and advantages of the present invention will be apparent from the following specification and claims and from the accompanying drawings wherein:

Description of the drawings

FIG. 1 is a perspective view of the vacuum stacker apparatus located at the terminal end of a conveyor;

FIG. 2 is a cross-sectional view taken along lines 2—2 of FIG. 1; and

FIG. 3 is a schematic of the electric control for the device.

Description of the invention

Referring now to the drawings wherein like reference numerals indicate identical parts in the various views, FIG. 1 illustrates the terminal ends of a belt conveyor 10 which is disposed in a generally horizontal plane and which may comprise any conventional conveyor system such as the plurality of continuous belts 11. In the present instance, the vacuum stacker apparatus is shown as being utilized to form a stack 12 of wood veneer sheets 13 which issue from the conveyor 10. The stack 12 may be formed on any known stack supporting apparatus such as that shown at 14, the details of which form no part of the present invention. It will be understood that although the present invention is described in connection with the handling of wood veneer sheets, the apparatus is not limited to use with any particular type of sheet material.

The vacuum stacker apparatus comprises the vacuum chamber indicated generally at 16 which may be varied in details of design and includes an imperforate top wall 17 and a perforated bottom wall 18 having the spaced holes or passages 19 therein. The chamber 16 may be made rectangular in cross section with channel irons or the like 20 forming the side walls and holding the top and bottom walls in spaced relation. The vacuum chamber 16 is supported by suitable uprights such as those shown at 22 so as to be disposed in a generally horizontal plane with one end thereof overlying the end of the conveyor 10 in close proximity thereto.

The opposite ends of the chamber 16 are provided with brackets 23 for mounting a drive shaft 24 on one end and a similar shaft (not shown) on the other end. The drive shaft 24 is provided with a plurality of pulleys or drive wheels 26 and it will be understood that similarly located rollers will be located at the opposite end of the vacuum chamber 16 in a conventional manner so as to mount the conveyor belts 27. The belts have their bottom runs moving across the perforated face of the bottom wall 18 of the chamber and their top runs moving across the top of the chamber as illustrated most clearly in FIG. 2. The drive shaft 24 is driven by an electrical motor 28 through the chain drive 29 and the associated drive sprockets in a conventional manner.

The chamber 16 is connected to a suitable source of vacuum through the vacuum conduits 31 and 32 which communicate with the chamber. The conduits 31 and 32 are provided with suitable butterfly valves 33 and 34 respectively for venting the chamber 16 to atmosphere. The valves 33 and 34 may be controlled by an appropriate means such as a hydraulic or pneumatic ram 36 which operates a crank arm 37 for rotating the shaft 38 to open and close the valves. It will also be understood that butterfly valves or the like may be located within the conduits 31 and 32 so as to close the conduits when the valves 33 and 34 are open to atmosphere. The actual structural details of the means for applying and venting vacuum pressure to the chamber 16 is considered to be well within the skill of one familiar with the art. For the purpose of the present invention, it is sufficient to point out that the chamber 16 may be vented to atmosphere by controlling the operation of a motor means such as the ram 36 as for example through a solenoid valve.

With this arrangement it may be seen that a single sheet 13 issuing from the conveyor 10 will be held against the belts 27 by the vacuum pressure within the chamber 16 and caused to move across the perforated surface of the bottom wall 18 as the belts are driven. A limit switch 39 is mounted on the vacuum chamber and has a contact arm 41 which extends beyond the bottom surface of the wall 18 so as to be contacted by the moving sheet 13. The function of the limit switch 39 and the contact arm 41 in controlling the operation of the stacker will be presently described in connection with the control system shown schematically in FIG. 3.

Referring to FIG. 3, closing of the limit switch 39 when a moving sheet contacts the switch arm 41 energizes a time delay relay TD-1 through the normally closed contact TDO-2 of a second time delay relay TD-2. Energization of the relay TD-1 closes its normally open contact TD-1-2 for locking in the relays around the switch 39 and opens its normally closed contact TD-1-3 which breaks the circuit through the motor 28 and deenergizes the motor. With the drive for the conveyor belts deenergized, a frictional drag on the moving sheet and the belts is created by the vacuum so as to accurately index the sheet. The contact TDC-1 of the relay TD-1 is a time delay closing contact which allows the sheet to come to a halt before closing. Upon closing of TDC-1 the second relay TD-2 is energized and the butterfly valve control solenoid S is immediately energized so as to operate the ram or other motor means 36 and to release the vacuum within the chamber 16. A circuit may also be completed through a counter 42 if desired. The contact TDO-2 is a delayed opening contact of the relay TD-2 which opens after the release of the vacuum and the dropping of the sheet and which acts to drop out the relay TD-1, thus closing the contact TD-1-3 to again energize the belt conveyor motor 28. The dropping of TD-1 also opens the contact TDC-1 which drops out the relay TD-2 and deenergizes the solenoid S to allow the butterfly valve to close and restore vacuum. This completes the operation cycle and restores the circuit so that the apparatus is ready for the reception and dropping of the next sheet.

From the foregoing it will be apparent to those skilled in the art that the present invention provides significant improvements in vacuum stacker apparatus by enabling the accurate indexing and dropping of sheets while avoiding damage to the sheet material.

The embodiments of the invention in which an exclusive property or privilege is claimed are defined as follows:

1. A device for conveying and stacking sheet material comprising in combination; a vacuum chamber having a perforated bottom wall, a plurality of endless conveyor members, means to mount said endless conveyor members for movement across said bottom wall, motor means connected to drive said conveyor members, valve means for controlling the application of vacuum pressure to said chamber, electrical control circuit means for sequentially deenergizing said motor means and actuating said valve means to vent the vacuum chamber to atmosphere after a given time delay, and limit switch means in the path of the moving sheet for activating said control circuit.

2. The device according to claim 1 in combination with an endless belt conveyor system for moving individual sheets; said vacuum chamber being disposed with one end thereof in overlapping relation with the terminal end of said conveyor system and spaced a slight distance thereabove, whereby sheets issuing from said conveyor system will be caused to adhere to said endless conveyor members and said bottom wall to be moved therealong to a dropping position.

3. The device according to claim 1 wherein said endless conveyor members comprise imperforate endless belts trained about said chamber with the bottom runs thereof running across the surface of said perforated bottom wall.

4. The device according to claim 3 wherein said limit switch includes a contact arm extending from the surface of said perforated bottom wall, said control circuit means comprising; a first relay actuated upon closing of said limit switch and having a normally closed contact adapted to open to break the electrical circuit through said motor means and a time delay closing contact for actuating said valve means after said motor has been deenergized, and a second relay actuated by the delay closing contact of said first relay, said second relay having a delay opening contact for deenergizing said first relay so as to energize said motor and to deactivate said valve means, thereby restoring said control circuit means ready for another cycle of operation.

References Cited
UNITED STATES PATENTS 3,081,996   3/1963   Hajos _____ 271—74

RICHARD E. AEGERTER, *Primary Examiner.*